United States Patent

[11] 3,610,877

[72] Inventor John J. Driscoll
 422 South 18th St., Allentown, Pa. 18104
[21] Appl. No. 157
[22] Filed Jan. 2, 1970
[45] Patented Oct. 5, 1971

[54] FLEXIBLE ELECTRODE STRUCTURE
 5 Claims, 4 Drawing Figs.
[52] U.S. Cl. .................................................... 219/145,
 219/119
[51] Int. Cl. ..................................................... B23k35/00,
 B23k 9/24, B23k 11/30
[50] Field of Search ........................................... 219/145,
 146, 119; 117/202, 203, 204, 205, 206, 207;
 148/64, 65, 66

[56] References Cited
 UNITED STATES PATENTS
 2,544,000 3/1951 Wasserman .................. 117/204
 3,345,495 10/1967 Quaas et al. .................. 219/146

*Primary Examiner*—J. V. Truhe
*Assistant Examiner*—Lawrence A. Rouse
*Attorney*—Howson and Howson ABSTRACT: An electrode for use in cutting or gouging metal by means of the Air carbon arc-cutting process. The electrode has a flexible structure which enables it to be stored on a reel and to be continuously fed therefrom into a metal-cutting zone by an automatic holder. The electrode comprises a series of relatively short, tubular segments of carbonaceous material disposed in end-to-end relation on a consumable metal wire extending lengthwise through the centers of the segments, and an electrically conductive, flexible covering surrounds and extends along the segments to protect them from damage. The carbonaceous segments carry the major portion of the current supplied to the electrode with the metal wire and covering providing secondary and tertiary electron flow paths for improving the current-carrying capacity of the electrode.

PATENTED OCT 5 1971
3,610,877
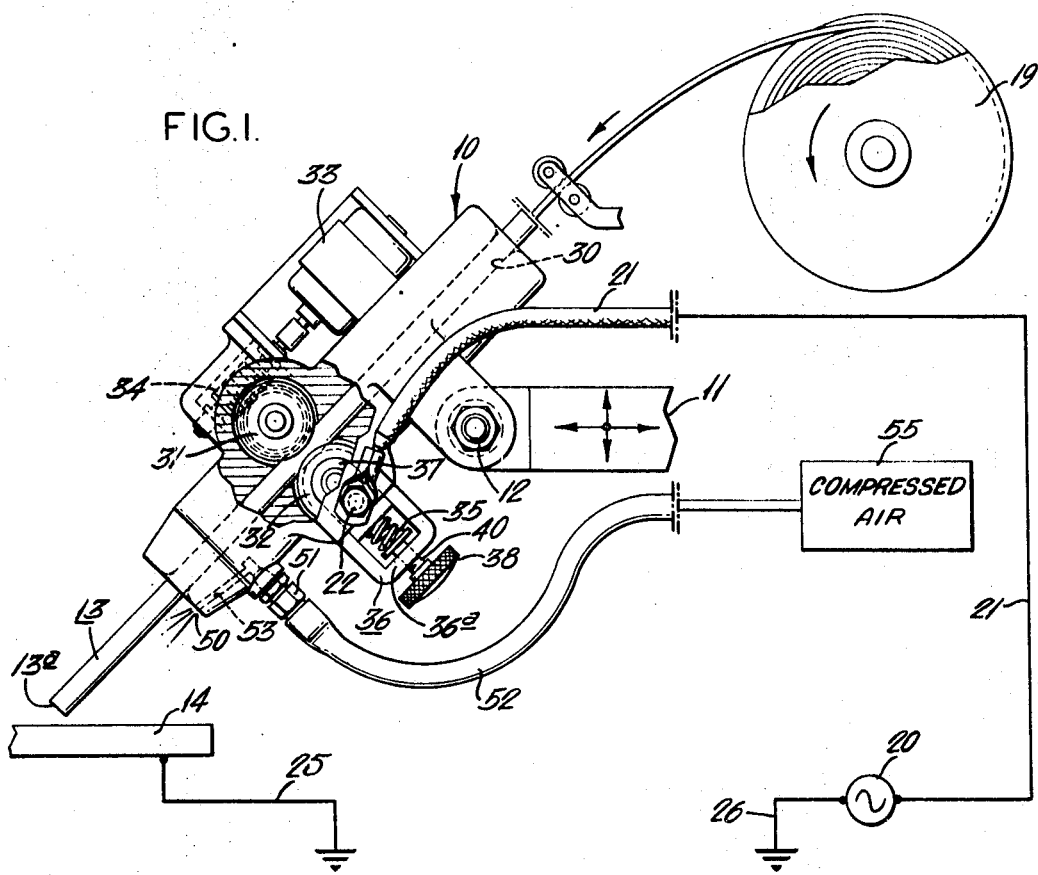
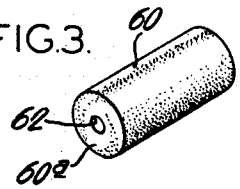
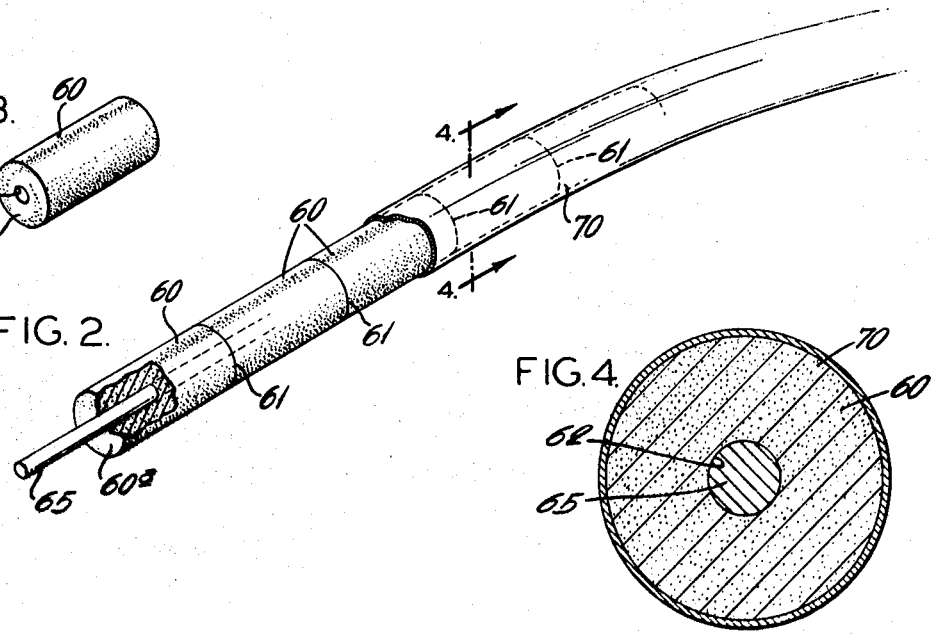
INVENTOR:
JOHN J. DRISCOLL
BY
Howson & Howson
ATTYS.

FLEXIBLE ELECTRODE STRUCTURE

The present invention relates to electrodes for use in cutting or gouging metal by the air carbon arc-cutting process, and more particularly, the present invention relates to flexible electrodes for use in such process.

At present, manual and semiautomatic apparatus is available for cutting or gouging metal by means of an electric arc. Conventional manual apparatus includes a pair of jaws operable by handles to clamp electrodes therebetween, current being supplied to the electrode through one of the handles. Conventional semiautomatic apparatus comprises a carriage for supporting a workpiece, an inclined electrode holder overlying the workpiece to dispose an electrode therein close proximity to the upper surface thereof, and means to displace the carriage while an electric arc is maintained between the electrode and the workpiece. The electrode employed in each of the aforementioned apparatus is a copper-coated rod about 1 foot in length and about three-sixteenths to one-half inch in diameter. Means may be provided to advance the electrode in increments as it is consumed or spent during the cutting or gouging operation.

When using the manual apparatus, it is normally possible to consume only about 10 inches of the 12-inch length of the electrode. Thus, a workman must continually remove there remaining short stubs and replace them with new electrodes. Since it is possible to consume an electrode in about a minute, it is apparent that a considerable portion of the workman's time is spent in replacing the electrode stubs. Also, the stubs are discarded, an economically wasteful procedure. In addition to the economic factor arising from the lost production time of a skilled workman, the quality of his work may be impaired because it is necessary for him to arrest the sweeping movement of his hand to change the electrodes. Furthermore, while changing electrodes the workpiece tends to cool, requiring additional energy and time to effect a cutting or gouging action after replacement of the electrode.

Electrodes are available which may be connected in end-to-end relation for use in semiautomatic apparatus to maintain continuity when effecting a cutting or gouging action. This type of electrode is illustrated in U.S. Pat. Nos. 3,030,544 and 3,399,322. A disadvantage of these electrodes is that an operator is required to connect them end-to-end as they are being consumed, and although normally wearing protective eye shielding, it is necessary for the operator to remove his eyeshield when interconnecting the electrodes. As a result, unless extreme caution is exercised, the operator's eyes may be subjected to harmful radiation, possibly causing serious injury or even blindness. Another disadvantage of existing semiautomatic apparatus is its lack of versatility; for example, it may not be employed on overhead or vertical surfaces since the telescopically connected electrodes tend to disengage one another when inclined upwardly rather than downwardly as in existing apparatus.

In view of the foregoing, it is a primary object of the present invention to provide a flexible electrode structure which may be stored on a reel so that it may be continuously consumed by apparatus which may operate in the absence of an operator.

It is another object of the present invention to provide a unique, flexible electrode structure which may be employed with a hand-held electrode holder to effect metal cutting or gouging on vertical and overhead surfaces in a manner which conserves labor.

As a further object, the present invention provides a flexible electrode which reduces the hazards to which an operator is presently subjected when interconnecting electrodes in existing cutting and gouging apparatus.

More specifically, the present invention provides a flexible electrode which is adapted to be stored on a reel for continuous feeding therefrom into a metal cutting or gouging zone. The electrode comprises a series of relatively short, tubular segments of carbonaceous matter disposed in end-to-end relation and electrically interconnected by means of an elongated, consumable core element or wire extending centrally therethrough. Thin, electrically conductive and elastic coating means surrounds the segments and interconnects them to provide a continuous flexible covering which protects the segments and enables the electrode structure to flex. Electrical energy is supplied to the electrode by contacts engaging the coating, the electrical energy being transferred along the electrode primarily by the carbonaceous segments with the coating and core means providing additional electron flow paths to improve the current-carrying capacity of the electrode.

These and other objects, features and advantages of the present invention should become apparent from the following description when taken in conjunction with the accompanying drawing, in which:

FIG. 1 is a side elevational view of an electrode holder in which is held a flexible electrode embodying the present invention, the electrode holder being broken away and sectioned to illustrate the electrode being fed toward a workpiece and being shown schematically connected to a source of electrical energy and compressed air;

FIG. 2 is a perspective view of the flexible electrode structure of the present invention with a portion of its outer covering removed to expose the carbonaceous segments one of which has a portion broken away and sectioned to illustrate a flexible core element extending therethrough;

FIG. 3 is a perspective view of one of the carbonaceous segments of the present electrode structure; and FIG. 4 is an enlarged sectional view taken along line 4—4 of FIG. 2.

Referring now to the drawing, there is illustrated in FIG. 1 apparatus employing a flexible electrode embodying the present invention to cut or gouge metal by means of the air carbon arc-cutting process. In the present instance, the apparatus comprises an electrode holder 10 pivotally connected to an arm 11 by means of a bolt 12 to dispose an electrode 13 at an acute angle with respect to a horizontally disposed workpiece 14. The arm 11 may be secured to suitable bracket or carriage means to enable the holder to be displaced horizontally and vertically with respect to the workpiece 14. If desired, however, the holder 10 may be mounted in a fixed position and the workpiece displaced relative thereto when being cut or gouged.

In order to supply electrical energy to the electrode 13, a generator 20 is connected to a terminal 22 on the underside of the holder 10 by a cable 21. The workpiece 14 and the generator 20 are electrically connected in a circuit by means of ground wires 25 and 26 respectively. Thus, when the circuit is energized, an arc is formed between the tip 13a of the electrode and the surface of the workpiece 14 to thereby effect a gouging action thereon. A cutting action is effected simply by increasing the power supplied to the electrode 13.

The electrode 13 is consumed as the surface of the workpiece 14 is gouged. In order to maintain a proper spacing between the tip 13a of the electrode and the surface of the workpiece to prevent the arc from being extinguished as the tip 13a burns away from the workpiece and the electrode is consumed, the electrode 13 is advanced axially toward the workpiece at a predetermined rate of speed which corresponds to the rate at which the electrode is being consumed. For this purpose, the holder 10 has a bore 30 extending lengthwise therethrough for slidably receiving the electrode 13 therein. The electrode is advanced axially through the bore 30 and toward the workpiece 14 by means of wheels 31 and 32 having concave peripheries which frictionally engage the surface of the electrode. In the present instance, the upper wheel 31 is driven by a small electric motor 33 mechanically coupled thereto through suitable gearing 34, and the lower wheel 32 rotates freely in response to the axial displacement of the electrode. Electrical energy is supplied to the electrode by the lower wheel 32 which is connected to the terminal 22. If desired, means may be provided to vary the speed of the motor 33 so that an operator may select a current and electrode feed rate in accordance with the desired cutting or gouging action to be effected.

In order to maintain adequate driving friction and electrical contact pressure between the electrode 13 and the wheels, the lower wheel 32 is biased upwardly into engagement with the underside of the electrode 13. This is effected by means of a compression spring 35 mounted in a bracket 36 which slidable receives a yoke 37 mounting the lower roller 32. The compression of the spring 35, and hence the driving friction and contact pressure, is adjusted by means of a knurled operator 38 having a shoulder engaging the lower end of the spring 35 and having a threaded body 40 aligned with the line of action of the spring and threaded into a lower endwall 36a on the bracket 36. Thus, when the operator 38 is selectively rotated in opposite directions, the pressure on the wheel 32 is varied to simultaneously adjust the frictional driving force on the electrode and the electrical contact pressure thereon.

In order to displace molten metal away from the tip of the electrode 13, compressed air from a reservoir 55 is expelled from an orifice 50 in the underside of the holder 10 and along the bottom of the electrode 13. Air is supplied to the orifice 50 through a fitting 51 connecting an air hose 52 to the orifice 50 through a passage 53 in the holder 10. The movement of air along the underside of the electrode assists in cooling the electrode while operating to displace molten metal away from the cutting zone.

The electrode holder described thus far is typical of the many holders presently in use on semiautomatic cutting and gouging apparatus. An example of manual apparatus for such purposes is illustrated in my U.S. Pat. No. 3,387,111. Both types of apparatus are capable of feeding straight lengths of carbon electrodes; however, as noted heretofore, an operator is required to keep the holders continuously supplied with electrodes, either by connecting them end-to-end as they are consumed, or by removing the spent electrode and replacing it with a fresh one.

In accordance with its primary object, the present invention provides an electrode structure which is adapted to be continuously fed into a work zone by the aforedescribed holders, or holders of like construction. To this end, the electrode structure of the present invention is flexible, thereby enabling it to be stored on a reel for continuous feeding by cutting or gouging apparatus. As may be seen in FIGS. 2 and 3, the electrode 13 comprises a series of relatively short, tubular segments 60,60 disposed in end-to-end relation with adjacent confronting end surfaces 60a,60a forming interfaces 61,61 therebetween the end surfaces normally being in engagement with one another when the electrode is disposed in a straightened configuration to provide a primary path for transferring electrical energy between the segments. In the present instance, the segments are of carbonaceous material which is molded into the configuration illustrated in FIG. 3; however, the segments may also be cut from long lengths of material if suitable molding apparatus is not available. The length of the segments may vary, depending on the diameter of the reel onto which the electrode is to be wound and the diameter of the electrode. As a rule, however, a length equal to about twice the electrode diameter is preferred.

The rate at which metal may be cut or gouged depends to a large extent on the electrical current applied between the electrode and the workpiece. As a general rule, high-current facilitates rapid cutting. Thus, it is desirable for cutting electrodes to possess good current-carrying properties.

In the present invention, the electrode has a series of tubular segments disposed in end-to-end relation and in contact with one another for conducting electrical energy through the electrode. In order to assist in maintaining the segments in proper relation and to provide a secondary path for transferring electrical energy between the segments, electrically conductive core means is disposed centrally in the segments 60,60 extending across the interfaces 61,61 therebetween. In the present invention, the core means is a continuous cylindrical element or wire 65 coextensive in length with the electrode 13 and flexible along its entire length. For the purpose of mounting the core means 65 on the inside of the electrode 13, each segment 60 has a central bore 62 extending lengthwise therethrough, the core means 65 fitting snugly in the bores. The core means or wire 65 is preferably of copper or copper alloy material having good electrical conductivity and having a melting temperature which is substantially the same as the temperature at which the segments 60,60 are disintegrated by the electric arc and which may be flexed sufficiently to enable unwinding from a reel. Thus, the core wire 65 may be consumed by the heat generated by the electric arc. Other materials, however, may provide adequate substitutes as long as the aforedescribed flexure and thermal properties are present. For example, flexible steel wire may be used where a slight impairment of conductivity is not objectionable and where a low-cost core-element is desired. Also, wire having the properties of conventional copper-alloy welding wire may be employed satisfactorily.

The core means 65 may be secured in the bores 62,62 by molding the segments 60,60 thereon, or by sliding the segments axially thereon. Whichever method is employed, however, it is desirable for the core means 65 to be in positive electrical contact with the segments in their bores. In this manner, electrical resistance between the core wire 65 and the segments is reduced to thereby provide an electrode having improved current-carrying capacity.

The electrode structure may be subjected to shocks and abrasion in use. As a result, the carbonaceous segments may be chipped or cracked, possibly adversely affecting their current-carrying capacity. Furthermore, in the present invention, it is important for the segments 60,60 to be in end-to-end abutting contact when the electrode is in a straightened configuration to ensure electrical contact therebetween; but, because of the inflexibility of the segments, it is also important for the segments to separate slightly at their ends to enable the electrode to be disposed in an arc. To this end, flexible coating means 70 (FIG. 2) is provided on the exterior of the segments. As may be seen in FIG. 2, the coating means 70 extends across the interfaces 61,61 between the ends of the segments 60,60 and, in the present instance, the coating means 70 is continuous along the length of the electrode 13. The coating means is flexible and elastic in both the circumferential and longitudinal directions and tightly engages the periphery of the segments. Thus, the lengthwise elasticity of the coating 70 causes the segments 60,60 to be normally disposed in end-to-end contact with one another, for example, as illustrated in its operative position in the holder-bore 30 in FIG. 1. However, the coating means 70 is also sufficiently flexible and elastic to permit the segments to separate slightly at their ends when disposed in an arc, for example, when in its storage position on a reel 19 as illustrated in FIG. 1.

From the foregoing, it should be apparent that the radius of curvature around which the electrode may be formed is dependent to a large extent on the flexibility and elasticity of the coating. Highly flexible and elastic coatings enable the electrode to be disposed in a smaller radius of curvature than would be possible with less flexible coatings.

Electrical energy is supplied to the carbonaceous segments 60,60 and core means 65 through the coating means 70 which provides a tertiary flow path for electrical energy in the electrode. Thus, in addition to being flexible and elastic, the coating should be electrically conductive. For this purpose, the coating means 70 is preferably formed by plating copper on the segments while they are disposed in end-to-end relation. However, the radius of curvature onto which a copper-plated electrode may be wound is not as great as would be possible if other electrically conductive but flexible coating materials were substituted. Thus, where increased flexibility is desired, the coating means 70 may be formed of electrically conductive hydrocarbon material which may be adhesively or otherwise secured to the segments. Whatever the composition of the coating means may be, it is important that it have a melting, combustion, or disintegrating temperature which corresponds substantially to the temperature of the electric arc so that the coating, the core, and the segments are consumed substantially simultaneously by the heat of the arc.

The electrode 13 is wound onto the storage reel 19 when it is manufactured, and the reel 19 is mounted for rotation on a suitable reel holder adjacent the zone in which it is to be used. In use, the electrode 13 is inserted axially in the holder 10, and the knurled operator 38 is rotated to cause the lower roller 32 to engage the electrode 13. The generator 20 is then energized to strike an arc between the tip 13a of the electrode 13 and the workpiece 14, and the motor 33 is also energized to cause the electrode 13 to advance axially downward at a predetermined rate to maintain the arc. A linear gouging or cutting action is effected when the workpiece 14 is displaced relative to the electrode holder 10 or vice versa. With this structure, a continuous cutting or gouging action may be effected without the necessity of an operator being present to continually supply electrodes to the holder.

When the electrode structure of the present invention is employed with manual cutting or gouging apparatus, an operator need only slightly open the jaws of the holder and displace the holder rearwardly relative to the electrode to thereby position a new length of electrode in operative relation between the holder and the workpiece. A considerable amount of labor may thereby be conserved to increase the productivity of the operator.

In view of the foregoing, it should be apparent that a novel electrode has now been provided having a flexible structure enabling it to be stored on a reel for continuous feeding into a cutting or gouging zone by a suitable electrode holder.

While a preferred embodiment of the present invention has been described in detail, various modifications, alterations or changes may be made without departing from the spirit and scope of the present invention.

What is claimed is:

1. A flexible electrode structure, comprising:
a series of relatively short tubular segments of carbonaceous material disposed in end-to-end relation with the confronting surfaces of adjacent segments being in operative contact with one another at an interface to form a first path for transferring electrical energy; elastic coating means surrounding said segments and spanning across each interface to provide an additional path for transferring electrical energy between the segments, said elastic coating means being electrically conductive and tightly engaging the outer periphery of the segments to cause the same to abut one another in end-to-end relation when disposed in a substantially straight line and to enable the segments to at least partially disengage each other when disposed in an arc; and flexible means forming a continuous elongated core element disposed axially in said segments and spanning across each interface operatively to maintain said segments in proper endwise registry with one another whereby a flexible electrode is provided.

2. An electrode structure according to claim 1 wherein said flexible-core means includes a wire having a disintegrating temperature corresponding approximately to the temperature at which said segments are disintegrated by an electric arc.

3. An electrode structure according to claim 1 wherein said elastic-coating means surrounding said segments is metallic and has a melting temperature corresponding approximately to the temperature at which said segments are disintegrated by an electric arc.

4. An electrode structure according to claim 1 wherein said elastic-coating means is copper and is plated onto said segments.

5. An electrode structure according to claim 1 wherein said elastic-coating means is an electrically conductive hydrocarbon.